United States Patent
Ruan et al.

(10) Patent No.: US 12,517,024 B2
(45) Date of Patent: Jan. 6, 2026

(54) METHOD OF EVALUATING THE ENAMEL MICROCRACK RESISTANCE EFFICACY OF COMPOSITIONS

(71) Applicant: Colgate-Palmolive Company, New York, NY (US)

(72) Inventors: Qichao Ruan, Hillsborough, NJ (US); Stacey Lavender, Chesterfield, NJ (US)

(73) Assignee: Colgate-Palmolive Company, New York, NY (US)

( * ) Notice: Subject to any disclaimer, the term of this patent is extended or adjusted under 35 U.S.C. 154(b) by 311 days.

(21) Appl. No.: 17/869,194

(22) Filed: Jul. 20, 2022

(65) Prior Publication Data
US 2023/0042124 A1    Feb. 9, 2023

Related U.S. Application Data

(60) Provisional application No. 63/223,726, filed on Jul. 20, 2021.

(51) Int. Cl.
*G01N 3/46* (2006.01)
*A61K 6/20* (2020.01)

(52) U.S. Cl.
CPC .............. *G01N 3/46* (2013.01); *A61K 6/20* (2020.01)

(58) Field of Classification Search
CPC .. G01N 3/42; G01N 3/44; G01N 3/46; G01N 3/48; G01N 3/52; G01N 3/50; G01N 3/54; G01N 33/4833; G01N 2203/0062; G01N 2203/0064; G01N 2203/0066; G01N 2203/00; G01N 2203/006; G01N 2203/0058; G01N 2203/0076; G01N 2203/0078; G01N 2203/008; G01N 2203/0082; A61K 6/00; A61K 6/20

See application file for complete search history.

(56) References Cited

U.S. PATENT DOCUMENTS

| | | | |
|---|---|---|---|
| 6,919,070 | B1 | 7/2005 | Rudin et al. |
| 9,034,301 | B2 | 5/2015 | Sakuma et al. |
| 9,433,569 | B2 | 9/2016 | Gualandi |
| 10,653,596 | B2 | 5/2020 | Giniger |
| 2010/0330002 | A1 | 12/2010 | Robinson et al. |
| 2014/0308217 | A1 | 10/2014 | Schaeffer-Korbylo et al. |
| 2016/0228341 | A1 | 8/2016 | Lucas et al. |
| 2017/0157171 | A1 | 6/2017 | Gerard et al. |

(Continued)

FOREIGN PATENT DOCUMENTS

| | | | |
|---|---|---|---|
| CN | 104490624 | | 4/2015 |
| CN | 109745235 A | * | 5/2019 |

(Continued)

OTHER PUBLICATIONS

Roberts, A. J. "Role of models in assessing new agents for caries prevention-non-fluoride systems." Advances in Dental Research 9.3 (1995): 304-311. (Year: 1995).*

(Continued)

*Primary Examiner* — Fatemeh Esfandiari Nia

(57) ABSTRACT

Disclosed are methods of determining enamel micro-crack and/or microscratch resistance and also methods of identifying compositions that are effective in increasing enamel micro-crack and/or microscratch resistance or evaluating the efficacy of compositions in increasing enamel micro-crack and/or microscratch resistance.

15 Claims, 2 Drawing Sheets

(56) References Cited

U.S. PATENT DOCUMENTS

| | | |
|---|---|---|
| 2018/0280263 A1 | 10/2018 | Rege et al. |
| 2018/0338892 A1 | 11/2018 | Budde et al. |
| 2019/0380929 A1* | 12/2019 | Sarikaya ............. A61K 8/64 |
| 2021/0007948 A1* | 1/2021 | Baig ................. A61K 8/21 |
| 2023/0038764 A1 | 2/2023 | Zhang et al. |
| 2023/0039655 A1 | 2/2023 | Zhang et al. |
| 2023/0045410 A1 | 2/2023 | Zhang et al. |

FOREIGN PATENT DOCUMENTS

| | | |
|---|---|---|
| EP | 0344832 | 10/1992 |
| WO | 2010/060816 | 6/2010 |
| WO | 2017/223497 | 12/2017 |

OTHER PUBLICATIONS

Amaechi, B T, S M Higham, and W M Edgar. "The Influence of Xylitol and fluoride on Dental Erosion in Vitro." Archives of Oral Biology, 1998, 5.

Anonymous, 2017, "Caries Prophylaxis Mouthwash", Mintel Database GNPD AN: 4855451.

Anonymous, 2018, "Berry Cocktail Flavoured Natural Toothpaste for Kids", Mintel Database GNPD AN: 5983327.

Anonymous, 2018, "Biocare Toothpaste", Mintel Database GNPD AN: 5669395.

Anonymous, 2018, "Toothpaste with Dispenser", Mintel Database GNPD AN: 5913975.

Anonymous, 2020, "Propolish Toothpaste", Mintel Database GNPD AN: 7941699.

Anonymous, 2021, "Professional Toothpastes Set", Mintel Database GNPD AN: 8447347.

Anonymous, 2021, "Tooth Protection Gel with bioHAP", Mintel Database GNPD AN: 9026546.

Anonymous, 2022, "Medicinal Toothpaste", Mintel Database GNPD AN: 9396316.

Cuy, J.L., A.B. Mann, K.J. Livi, M.F. Teaford, and T.P. Weihs. "Nanoindentation Mapping of the Mechanical Properties of Human Molar Tooth Enamel." Archives of Oral Biology 47, No. 4 (Apr. 2002): 281-91.

Elfallah et al., 2015, "Effect of tooth bleaching agents on protein content and mechanical properties of dental enamel", Acta Biomaterialia, 20:120-128.

International Search Report and the Written Opinion of the International Searching Authority issued in International Application PCT/US2022/037689 mailed Nov. 14, 2022.

International Search Report and the Written Opinion of the International Searching Authority issued in International Application PCT/US2022/037691 mailed Nov. 23, 2022.

International Search Report and the Written Opinion of the International Searching Authority issued in International Application PCT/US2022/037692 mailed Nov. 2, 2022.

International Search Report and the Written Opinion of the International Searching Authority issued in International Application PCT/US2022/037703 mailed Nov. 10, 2022.

Khoroushi et al., 2016, "Fracture toughness of bleached enamel: Effect of applying three different nanobiomaterials by nanoindentation test", Contemporary Clinical Dentistry, 7(2):209-215.

Ruan, Qichao, and Janet Moradian-Oldak. "Amelogenin and Enamel Biomimetics." Journal of Materials Chemistry B 3, No. 16 (2015): 3112-29.

Yu et al., 2016, "Investigation on the remineralization effect of arginine toothpaste for early enamel caries: nanotribological and nanomechanical properties", Journal of Physics D: Applied Physics,49:435401.

Bajaj et al., "Fracture processes and mechanisms of crack growth resistance in human enamel", JOM (2010), 62, 76-82.

Park et al., "On the brittleness of enamel and selected dental materials", Dental Materials (2008), 24(11):1477-1485.

Hayashi-Sakai et al, 2012, "Determination of fracture toughness of human permanent and primary enamel using an indentation microfracture method", Journal of Materials Science: Materials in Medicine, vol. 23, No. 9, pp. 2047-2054.

Padmanabhan S K et al, 2010, "Micro-indentation fracture behavior of human enamel", Dental Materials, vol. 26, No. 1, pp. 100-104.

Zheng J et al, 2013, "Effect of water content on the nanomechanical properties and microtribological behaviour of human tooth enamel", Wear, vol. 301, No. 1, pp. 316-323.

Zheng L et al, 2010, "Effect of remineralization on the nanomechanical properties and microtribological behaviour of acid-eroded human tooth enamel", Wear, vol. 271, No. 9, pp. 2297-2304.

* cited by examiner

METHOD OF EVALUATING THE ENAMEL MICROCRACK RESISTANCE EFFICACY OF COMPOSITIONS

CROSS-REFERENCE TO RELATED APPLICATIONS

This application claims the benefit of priority to U.S. Provisional Patent Application Ser. No. 63/223,726, filed Jul. 20, 2021 the contents of which are incorporated herein by reference in its entirety.

BACKGROUND

Enamel micro-cracks (EMC) are described as incomplete fractures of the enamel without loss of tooth structure. They could also be referred to as craze lines, enamel infractions, or hairline fractures with the order of microns in size. Although prevalence has not clearly been reported, enamel micro-crack has been reported as "very common", occurring more frequently with aging.

The formation of enamel micro-cracks could be caused by many external factors such as the temperature variations, traumas, and the physical insults from repeated loading (grinding) and some dental procedures. Another important intrinsic factor for the EMC formation is the chemical and physical changes of enamel with the ages. Studies have demonstrated that the enamel of primary teeth is more elastic and softer when compared to the enamel in adult teeth. In addition, the outer enamel of younger adult teeth shows lower fracture toughness and brittleness than the ones with senior adults. In other words, senior teeth are more brittle and susceptible to enamel damage and cracking along the surface of the enamel. In the field of endodontics there are five different types of longitudinal cracks that can be described, craze lines, fractured cusp, split tooth, cracked tooth, and vertical root fractures. Craze lines or enamel micro cracks only affect the enamel, while the other types of cracks can affect enamel, dentin and possibly the pulp.

Although the enamel micro-cracks or craze lines have been reported as very common, if a localized small enamel micro-crack is asymptomatic, there is typically no treatment provided by a dental professional. However, our studies have suggested that the enamel micro-cracks could be associated with more problems such as the visually unappealing and the potential to weaken enamel. For example, the micro-cracks in the enamel allow extrinsic stains to diffuse and accumulate resulting in more staining on the enamel surface. In addition, enamel is softer in the micro-crack region. This can cause local areas of increased or deeper demineralization, which weakens the mechanical properties of enamel. Furthermore, when enamel is exposed to acid, the micro-cracks become wider and more damages are observed with micro-cracks.

Enamel microscratch is one form of early enamel damage that cannot be seen by naked eyes. Microscratch occurs where the teeth start to lose enamel irreversibly due to the external mechanical actions. Continuous scratching will lead to a tooth abrasion which has been widely observed clinically, especially at the cervical and occlusal surfaces. The prevalence studies have indicated that tooth wear including abrasion is an increasing problem, especially in the elderly, as it is more common in this age group. An investigation found that 42% of the 20-to-29-year age group associated with abrasions, while the 40-to-49-year age group exhibited 76% with abrasions. See Litonjua L A, Andreana S, Bush P J, Cohen R E. Tooth wear: attrition, erosion, and abrasion. Quintessence Int. 2003 June; 34(6):435-46. Another study has reported that the percentage of adults presenting with severe tooth wear increases from 3% at the age of 20 years to 17% at the age of 70 years. See Van't Spijker A, Rodriguez J M, Kreulen C M, Bronkhorst E M, Bartlett D W, Creugers N H. Prevalence of tooth wear in adults. Int J Prosthodont. 2009 January-February; 22(1):35-42. Clearly increasing levels of tooth wear is significantly associated with age.

Therefore, there is a need for oral care compositions that provide improved enamel protection, remineralization and/or or increase enamel microcrack and/or microscratch resistance.

BRIEF SUMMARY

In one aspect, the disclosure provides a method of determining enamel micro-crack resistance; comprising:
a) providing an enamel sample;
b) generating micro-cracks on the enamel sample;
c) measuring and/or calculating one or more micro-crack characteristics or mechanical properties of the enamel; and
d) determining the micro-crack resistance in the enamel sample.

In another aspect, the disclosure provides a method of determining enamel microscratch resistance; comprising:
a) providing an enamel sample;
b) generating microscratches on the enamel sample;
c) measuring and/or calculating one or more micro-crack characteristics or mechanical properties of the enamel; and
d) determining the micro-crack resistance in the enamel sample.

In another aspect, the disclosure provides a method of identifying compositions that are effective in increasing enamel micro-crack resistance or evaluating the efficacy of compositions in increasing enamel micro-crack resistance; comprising:
a) providing an enamel sample;
b) generating micro-cracks (baseline micro-cracks) on the enamel sample;
c) measuring and/or calculating one or more micro-crack characteristics or mechanical properties of the enamel;
d) treating the enamel sample with a test composition;
e) generating micro-cracks (post-treatment micro-cracks) on the enamel sample;
f) measuring and/or calculating one or more micro-crack characteristics or mechanical properties of the enamel;
g) determining one or more parameters which are changes of the one or more micro-crack characteristics or mechanical properties of the enamel by calculating the difference between the corresponding values obtained before and after the treatment;
h) comparing the one or more parameters of the test composition with those of a control composition; and
i) selecting or identifying the test composition for further development or evaluating the efficacy of the composition in increasing enamel micro-crack resistance based on its ability to increase micro-crack resistance relative to the control composition.

In another aspect, the disclosure provides a method of identifying compositions that are effective in increasing enamel microscratch resistance or evaluating the efficacy of compositions in increasing enamel microscratch resistance; comprising:

a) Preparing an enamel sample;
b) generating microscratch (baseline microscratches) on the enamel sample;
c) measuring and/or calculating one or more microscratch characteristics or mechanical properties of the enamel;
d) treating the enamel sample with a test composition (e.g., treatment with slurry followed by subsequent challenge treatment (e.g., acid challenge);
e) generating microscratches (post-treatment microscratches) on the enamel sample;
f) measuring and/or calculating one or more microscratch characteristics or mechanical properties of the enamel;
g) determining one or more parameters which are changes of the one or more microscratch characteristics or mechanical properties of the enamel by calculating the difference between the corresponding values obtained before and after the treatment;
h) comparing the one or more parameters of the test composition with those of a control composition; and
i) selecting or identifying the composition for further development or evaluating the efficacy of the composition in increasing enamel microscratch resistance based on its ability to increase microscratch resistance relative to the control composition.

In some embodiments, the one or more micro-crack characteristics or mechanical properties of the enamel are selected from crack length, fracture toughness, brittleness, and a combination thereof. The micro-cracks are generated by impressing an indenter into the enamel sample with a load. The enamel sample may be a human or bovine enamel. In some embodiments, the load is 200 gf-1000 gf, e.g., 200 gf, 300 gf, 500 gf, or 1000 gf. In some embodiments, the indenter is in the form of a square-based pyramid. In some embodiments, the indenter is a diamond indenter, e.g., a diamond in the form of a square-based pyramid, e.g., a Vickers diamond. In some embodiments, the enamel sample is treated with the composition by applying the composition to the enamel sample, e.g., for at least 1 minute, for at least 2 minutes, for at least 3 minutes, for at least 5 minutes, or for at least 10 minutes. The composition may be an oral care composition selected from a toothpaste, a gel, a mouthwash and a varnish. The efficacy of the composition in increasing enamel micro-crack resistance is determined by comparing one or more parameters of the tested composition with those of a control composition. In some embodiments, the one or more parameters is selected from change in crack length, change in fracture toughness, change in brittleness and a combination thereof.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

DETAILED DESCRIPTION

Figure 1:
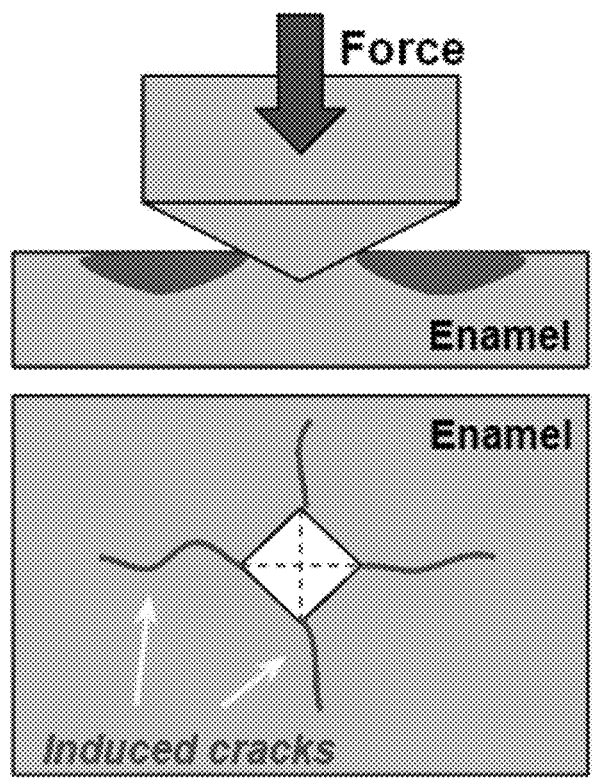
FIG. 1 shows a schematic image of micro-cracks induced by Vickers' indentation.

The following description of various typical aspect(s) is merely exemplary in nature and is in no way intended to limit the disclosure, its application, or uses.

As used throughout, ranges are used as shorthand for describing each and every value that is within the range. Any value within the range can be selected as the terminus of the range.

Unless otherwise specified, all percentages and amounts expressed herein and elsewhere in the specification should be understood to refer to percentages by weight. The amounts given are based on the active weight of the material.

The present disclosure provides, in an aspect, a method (Method 1.0) of determining enamel micro-crack resistance; comprising:
a) providing an enamel sample;
b) generating micro-cracks on the enamel sample;
c) measuring and/or calculating one or more micro-crack characteristics or mechanical properties of the enamel; and
d) determining the micro-crack resistance in the enamel sample.

For example, the disclosure includes:
1.1. Method 1.0, wherein the enamel sample is a human or bovine enamel.
1.2. Any of the preceding methods, wherein the enamel sample is a human enamel, optionally wherein the human enamel sample is obtained by cutting the crown of a molar longitudinally into slices, e.g., slices that are about 1-2 mm thick, e.g., 2 mm thick.
1.3. Any of the preceding methods, wherein the enamel sample is a bovine enamel, optionally wherein the bovine enamel sample is obtained by cutting the labial surface of an incisor into slices, e.g., slices that are about 1-2 mm thick, e.g., 1 mm thick.
1.4. Any of the preceding methods, wherein the micro-cracks are generated by impressing an indenter into the enamel sample with a load (force), optionally wherein the load is 200 gf-1000 gf, e.g., 200 gf, 300 gf, 500 gf, or 1000 gf.
1.5. Any of the preceding methods, wherein the load is 500 gf.
1.6. Any of the preceding methods, wherein the enamel sample is a human enamel, e.g., a human enamel obtained by cutting the crown of a molar longitudinally into slices, e.g., slices that are about 1-2 mm thick, e.g., 2 mm thick and the load is 500 gf.
1.7. Any of the preceding methods, wherein the indenter is in the form of a square-based pyramid.
1.8. Any of the preceding methods, wherein the indenter is a diamond indenter, e.g., a diamond in the form of a square-based pyramid, e.g., a Vickers diamond.
1.9. Any of the preceding methods, wherein in step b), Palmqvist cracks are generated at indentation corners.
1.10. Any of the preceding methods, wherein the one or more micro-crack characteristics or mechanical properties of the enamel are selected from crack length, fracture toughness, brittleness, and a combination thereof.
1.11. Any of the preceding methods, wherein the crack length is measured from the tip of the indentation diagonal to the end of the crack tip.
1.12. Any of the preceding methods, wherein lower crack length, higher fracture toughness, lower crack brittleness, or a combination thereof indicates higher micro-crack resistance of the enamel sample.
1.13. Any of the preceding methods, wherein the composition is an oral care composition.

The present disclosure, in another aspect, provides a method (Method 2.0) of a method of identifying compositions that are effective in increasing enamel micro-crack resistance or evaluating the efficacy of compositions in increasing enamel micro-crack resistance; comprising:

a) providing an enamel sample;
b) generating micro-cracks (baseline micro-cracks) on the enamel sample;
c) measuring and/or calculating one or more micro-crack characteristics or mechanical properties of the enamel;
d) treating the enamel sample with a composition;
e) generating micro-cracks (post-treatment micro-cracks) on the enamel sample;
f) measuring and/or calculating one or more micro-crack characteristics or mechanical properties of the enamel;
g) determining one or more parameters which are changes of the one or more micro-crack characteristics or mechanical properties of the enamel by calculating the difference between the corresponding values obtained before and after the treatment.
h) comparing the one or more parameters of the composition with those of a control composition; and
i) selecting or identifying the composition for further development or evaluating the efficacy of the composition in increasing enamel micro-crack resistance based on its ability to increase micro-crack resistance relative to the control composition.

For example, the disclosure includes:

2.1. Method 2.0, wherein the enamel sample is a human or bovine enamel.
2.2. Any of the preceding methods, wherein the enamel sample is a human enamel, optionally wherein the human enamel sample is obtained by cutting the crown of a molar longitudinally into slices, e.g., slices that are about 1-2 mm thick, e.g., 2 mm thick.
2.3. Any of the preceding methods, wherein the enamel sample is a bovine enamel, optionally wherein the bovine enamel sample is obtained by cutting the labial surface of an incisor into slices, e.g., slices that are about 1-2 mm thick, e.g., 1 mm thick.
2.4. Any of the preceding methods, wherein the micro-cracks (baseline micro-cracks and post-treatment micro-cracks) are generated by impressing an indenter into the enamel sample with a load (force), optionally wherein the load is 200 gf-1000 gf, e.g., 200 gf, 300 gf, 500 gf, or 1000 gf.
2.5. Any of the preceding methods, wherein the load is 500 gf.
2.6. Any of the preceding methods, wherein the enamel sample is a human enamel, e.g., a human enamel obtained by cutting the crown of a molar longitudinally into slices, e.g., slices that are about 1-2 mm thick, e.g., 2 mm thick and the load is 500 gf.
2.7. Any of the preceding methods, wherein the indenter is in the form of a square-based pyramid.
2.8. Any of the preceding methods, wherein the indenter is a diamond indenter, e.g., in the form of a square-based pyramid, e.g., a Vickers diamond.
2.9. Any of the preceding methods, wherein in steps b) and e), the micro-cracks are generated at the same condition (e.g., the same indenter, the same load).
2.10. Any of the preceding methods, wherein in steps b) and e), Palmqvist cracks are generated at indentation corners.
2.11. Any of the preceding methods, wherein in steps c) and f), the one or more micro-crack characteristics or mechanical properties of the enamel are selected from crack length, fracture toughness, brittleness, and a combination thereof.
2.12. Any of the preceding methods, wherein the crack length is measured from the tip of the indentation diagonal to the end of the crack tip.
2.13. Any of the preceding methods, wherein in step d), the enamel sample is treated with the composition by applying the composition to the composition, e.g., for at least 1 minute, for at least 2 minutes, for at least 3 minutes, for at least 5 minutes, or for at least 10 minutes, e.g., for 1, 2, 3, 4, 5, 6, 7, 8, 9, or 10 minutes.
2.14. Any of the preceding methods, wherein in step d), the enamel sample is treated with the composition more than once, e.g., 2-10 times.
2.15. Any of the preceding methods, wherein the composition is an oral care composition, optionally wherein the composition is selected from a toothpaste (dentifrice), a prophylactic paste, a tooth powder, a gel, a chewing gum, mousse, tablet, a lozenge, a mouthwash, a paint-on gel, and varnish.
2.16. Any of the preceding methods, wherein the composition is an oral care composition selected from a toothpaste, a gel and a mouthwash.
2.17. Any of the preceding methods, wherein the composition is a solution, e.g., water or a buffered solution, e.g., phosphate buffered saline (PBS), containing a compound of interest, e.g., a compound known to affect mechanical properties of tooth enamel, e.g., a compound known to remineralize tooth enamel, e.g., fluoride, basic amino acids, e.g., arginine and HAP (hydroxyapatite).
2.18. Any of the preceding methods, wherein in step d), the enamel sample is kept in a remineralization solution between the treatments and/or after the last treatment, optionally wherein the enamel ample is kept in the remineralization solution at about 37° C., e.g., for at least 1 day, e.g., for at least 2 days, e.g., for 5 days.
2.19. Any of the preceding methods, wherein the remineralization solution contains calcium chloride, optionally wherein the remineralization solution contains $CaCl_2 \cdot 2H_2O$, $KH_2PO_4$, KCl and HEPEs buffer and the pH of the remineralization solution is adjusted to 7.
2.20. Any of the preceding methods, wherein the one or more parameters is selected from change in crack length, change in fracture toughness, change in brittleness and a combination thereof.
2.21. Any of the preceding methods, wherein the increase of enamel micro-crack resistance is determined by the decrease of crack length, the increase of fracture toughness, the decrease of brittleness, or a combination thereof
2.22. Any of the preceding methods, wherein the one or more parameters comprise or is change in crack length and wherein the decrease in crack length indicates that enamel micro-crack resistance is increased.
2.23. Any of the preceding methods, wherein the one or more parameters comprise or is change in fracture toughness and wherein the increase in fracture toughness indicates that enamel micro-crack resistance is increased.
2.24. Any of the preceding methods, wherein the one or more parameters comprise or is change in brittleness and wherein the decrease in crack brittleness indicates that enamel micro-crack resistance is increased.
2.25. Any of the preceding methods, wherein the control composition is a solution, e.g., water or a buffered solution, e.g., phosphate buffered saline (PBS), optionally wherein the control composition is water.

2.26. Any of the preceding methods, wherein the composition in step d) is an oral care composition, the control composition is the same type of oral care composition as the composition, and the control composition does not contain any ingredient that affects physical properties of tooth enamel, e.g., remineralizes tooth enamel.

2.27. Any of the preceding methods, wherein the composition in step d) is a solution, e.g., water or a buffered solution, e.g., phosphate buffered saline (PBS), containing a compound of interest, e.g., a compound known to affect mechanical properties of tooth enamel, e.g., a compound known to remineralize tooth enamel, e.g., fluoride, basic amino acids, e.g., arginine, and HAP (hydroxyapatite) and the control composition is the same as the composition except that the control composition does not contain the compound of interest.

2.28. Any of the preceding methods, wherein the composition is an oral care composition.

The present disclosure provides, in another aspect, a method (Method 3.0) of determining enamel microscratch resistance; comprising:
a) providing an enamel sample;
b) generating microscratches on the enamel sample;
c) measuring and/or calculating one or more microscratch characteristics or mechanical properties of the enamel; and
d) determining the microscratch resistance in the enamel sample.

For example, the disclosure includes:

3.1. Method 3.0, wherein the enamel sample is a human or bovine enamel.

3.2. Any of the preceding methods, wherein the enamel sample is a human enamel, optionally wherein the human enamel sample is sectioned longitudinally.

3.3. Any of the preceding methods, wherein the enamel sample is human or bovine enamel, and wherein the enamel sample is prepared by grinding and polishing (e.g., by a sequential series of silicon carbide polishing using 400-4000 grit silicon carbide papers.

3.4. Any of the preceding methods, wherein the microscratches are generated by nanoindentation (e.g., with a Berkovitch diamond tip indenter) to generate a baseline microscratch (microscratch 1).

3.5. Any of the preceding methods, wherein the microscratch is generated by maintaining a force from 5 mN-50 mN (e.g., 10 mN) upon the enamel (e.g., via application with an indenter).

3.6. Any of the preceding methods, wherein the indenter is in the form of a diamond-tip (e.g., a Berkovitch diamond tip indenter).

3.7. Any of the preceding methods, wherein the indenter is a diamond indenter, e.g., a diamond in the form of a square-based pyramid, e.g., a Vickers diamond.

3.8. Any of the preceding methods, wherein the one or more microscratch characteristics or mechanical properties of the enamel are selected from scratch length, depth, and volume.

3.9. Any of the preceding methods, wherein the enamel is treated with a test composition (e.g., a toothpaste slurry or gel slurry).

3.10. Any of the preceding methods, wherein the enamel is subjected to an acid challenge subsequent to being treated with a test composition (e.g., wherein the acid challenges comprises treatment with 1% citric acid (pH adjusted to 3.6)).

3.11. The method of 3.10, wherein the acid challenge is administered subsequent to the test composition, and wherein this procedure is repeated daily for at least five days.

3.12. Any of the preceding methods, wherein the enamel samples are subject to further microscratches (microscratch 2) subsequent to treatment with the test composition and/or acid challenge.

3.13. The method of 3.12, wherein the microscratches are recorded (e.g., using a microscope) and wherein the width, depth and volume of the microscratch (microscratch 2) are measured.

3.14. Any of the preceding methods, wherein statistical analysis are conducted between testing samples (e.g., microscratch 2) and controls (e.g., microscratch 1, e.g., baseline microscratch) to evaluate the efficacy of products/formulations in microscratch resistance.

3.15. Any of the preceding methods, wherein a reduction in width, depth and volume, or a combination thereof, of the microscratch 2 relative to the microscratch 1 (e.g., baseline microscratch) indicates higher microscratch resistance of the enamel sample.

3.16. Any of the preceding methods, wherein the composition is an oral care composition.

The present disclosure, in another aspect, provides a method (Method 4.0) of a method of identifying compositions (e.g., oral care compositions) that are effective in increasing enamel microscratch resistance or evaluating the efficacy of compositions in increasing enamel microscratch resistance; comprising:
a) providing an enamel sample;
b) generating one or more microscratches (baseline microscratches) on the enamel sample;
c) measuring and/or calculating one or more microscratch characteristics or mechanical properties of the enamel;
d) treating the enamel sample with a test composition;
e) generating one or more microscratches (post-treatment microscratches) on the enamel sample;
f) measuring and/or calculating one or more post-treatment microscratch characteristics or mechanical properties of the enamel;
g) determining one or more parameters which are changes of the one or more microscratch characteristics or mechanical properties of the enamel by calculating the difference between the corresponding values obtained before and after the treatment.
h) comparing the one or more parameters of the test composition with those of a control composition; and
i) selecting or identifying the composition for further development or evaluating the efficacy of the test composition in increasing enamel microscratch resistance based on its ability to increase microscratch resistance relative to the control composition.

For example, the disclosure includes:

4.1 Method 4.0, wherein the enamel sample is a human or bovine enamel.

4.2 Any of the preceding methods, wherein the enamel sample is a human enamel, optionally wherein the human enamel sample is sectioned longitudinally.

4.3 Any of the preceding methods, wherein the enamel sample is human or bovine enamel, and wherein the enamel sample is prepared by grinding and polishing (e.g., by a sequential series of silicon carbide polishing using 400-4000 grit silicon carbide papers.

4.4 Any of the preceding methods, wherein the microscratches are generated by nanoindentation (e.g., with a Berkovitch diamond tip indenter) to generate a baseline microscratch (microscratch 1).

4.5 Any of the preceding methods, wherein the microscratch is generated by maintaining a force from 5 mN-50 mN (e.g., 10 mN) upon the enamel (e.g., via application with an indenter).

4.6 Any of the preceding methods, wherein the indenter is in the form of a diamond-tip (e.g., a Berkovitch diamond tip indenter).

4.7 Any of the preceding methods, wherein the indenter is a diamond indenter, e.g., a diamond in the form of a square-based pyramid, e.g., a Vickers diamond.

4.8 Any of the preceding methods, wherein the one or more microscratch characteristics or mechanical properties of the enamel are selected from scratch length, depth, and volume.

4.9 Any of the preceding methods, wherein the enamel is treated with the test composition (e.g., a toothpaste slurry or gel slurry).

4.10 Any of the preceding methods, wherein the enamel is subjected to an acid challenge subsequent to being treated with a test composition (e.g., wherein the acid challenges comprise treatment with 1% citric acid (pH adjusted to 3.6)).

4.11 The method of 4.10, wherein the acid challenge is administered subsequent to the test composition, and wherein this procedure is repeated daily for at least five days.

4.12 Any of the preceding methods, wherein the enamel samples are subject to further microscratches (microscratch 2) subsequent to treatment with the test composition and/or acid challenge.

4.13 The method of 4.12, wherein the microscratches are recorded (e.g., using a microscope) and wherein the width, depth and volume of the microscratch (microscratch 2) are measured.

4.14 Any of the preceding methods, wherein statistical analysis are conducted between testing samples (e.g., microscratch 2) and controls (e.g., microscratch 1, e.g., baseline microscratch) to evaluate the efficacy of products/formulations in microscratch resistance.

4.15 Any of the preceding methods, wherein a reduction in width, depth and volume, or a combination thereof, of the microscratch 2 relative to the microscratch 1 (e.g., baseline microscratch) indicates higher microscratch resistance of the enamel sample.

4.16 Any of the preceding methods, wherein in step d), the enamel sample is treated with the composition by applying the test composition to the composition, e.g., for at least 1 minute, for at least 2 minutes, for at least 3 minutes, for at least 5 minutes, or for at least 10 minutes, e.g., for 1, 2, 3, 4, 5, 6, 7, 8, 9, or 10 minutes.

4.17 Any of the preceding methods, wherein in step d), the enamel sample is treated with the test composition more than once, e.g., 2-10 times.

4.18 Any of the preceding methods, wherein the test composition is an oral care composition, optionally wherein the composition is selected from a toothpaste (dentifrice), a prophylactic paste, a tooth powder, a gel, a chewing gum, a lozenge, a mouthwash, a paint-on gel, and varnish.

4.19 Any of the preceding methods, wherein the composition is an oral care composition selected from a toothpaste, a gel and a mouthwash.

4.20 Any of the preceding methods, wherein the test composition is a solution, e.g., water or a buffered solution, e.g., phosphate buffered saline (PBS), containing a compound of interest, e.g., a compound known to affect mechanical properties of tooth enamel, e.g., a compound known to remineralize tooth enamel, e.g., fluoride, basic amino acids, e.g., arginine and HAP (hydroxyapatite).

4.21 Any of the preceding methods, wherein in step d), the enamel sample is kept in a remineralization solution between the treatments and/or after the last treatment, optionally wherein the enamel ample is kept in the remineralization solution at about 37° C., e.g., for at least 1 day, e.g., for at least 2 days, e.g., for 5 days.

4.22 Any of the preceding methods, wherein the remineralization solution contains calcium chloride, optionally wherein the remineralization solution contains $CaCl_2.2H_2O$, $KH_2PO_4$, KCl and HEPEs buffer and the pH of the remineralization solution is adjusted to 7.

4.23 Any of the preceding methods, wherein the one or more parameters is selected from changes in microscratch width, depth, volume, or a combination thereof 4.24 Any of the preceding methods, wherein the increase of enamel microscratch resistance is determined by the decrease of width, depth, volume, or a combination thereof, wherein the decrease is relative from the post-treatment microscratch (e.g., microscratch 2) relative to the baseline microscratch (microscratch 1).

4.25 Any of the preceding methods, wherein the one or more parameters comprise or is change in scratch width and wherein the decrease in scratch width indicates that enamel microscratch resistance is increased.

4.26 Any of the preceding methods, wherein the one or more parameters comprise or is change in scratch depth and wherein the decrease in scratch depth indicates that enamel microscratch resistance is increased.

4.27 Any of the preceding methods, wherein the one or more parameters comprise or is change in volume and wherein the decrease in scratch volume indicates that enamel microscratch resistance is increased.

4.28 Any of the preceding methods, wherein the control composition is a solution, e.g., water or a buffered solution, e.g., phosphate buffered saline (PBS), optionally wherein the control composition is water.

4.29 Any of the preceding methods, wherein the composition in step d) is an oral care composition, the control composition is the same type of oral care composition as the composition, and the control composition does not contain any ingredient that affects physical properties of tooth enamel, e.g., remineralizes tooth enamel.

4.30 Any of the preceding methods, wherein the composition in step d) is a solution, e.g., water or a buffered solution, e.g., phosphate buffered saline (PBS), containing a compound of interest, e.g., a compound known to affect mechanical properties of tooth enamel, e.g., a compound known to remineralize tooth enamel, e.g., fluoride, basic amino acids, e.g., arginine, and HAP (hydroxyapatite) and the control composition is the same as the composition except that the control composition does not contain the compound of interest.

4.31 Any of the preceding methods, wherein the composition is an oral care composition.

In some aspects, any of the methods described herein (e.g., any of Method 1.0, et seq., Method 2.0, et seq., Method 3.0 et seq., Method 4.0 et seq.) can be used as part of a method of screening oral care compositions and further selecting said oral care compositions for further development.

As used herein, an "oral care composition" refers to a composition for which the intended use includes oral care, oral hygiene, and/or oral appearance, or for which the intended method of use comprises administration to the oral cavity, and refers to compositions that are palatable and safe for topical administration to the oral cavity, and for providing a benefit to the teeth and/or oral cavity. The term "oral care composition" thus specifically excludes compositions which are highly toxic, unpalatable, or otherwise unsuitable for administration to the oral cavity. In some embodiments, an oral care composition is not intentionally swallowed, but is rather retained in the oral cavity for a time sufficient to affect the intended utility. The oral care compositions as disclosed herein may be used in nonhuman mammals such as companion animals (e.g., dogs and cats), as well as by humans. In some embodiments, the oral care compositions as disclosed herein are used by humans. Oral care compositions include, for example, dentifrice and mouthwash.

The present disclosure relates to a method of screening for compositions that are effective in increasing enamel micro-crack resistance. As used herein, enamel micro-crack (EMC) refers to incomplete fractures of the enamel without loss of tooth structure. They can also be referred to as craze lines, enamel infractions, or hairline fractures with the order of microns in size. Enamel micro-crack is common, occurring more frequently as people age. Unlike enamel damage or microdamage resulting from chemical or biological derived acid such as enamel erosion or caries, enamel micro-cracks are mainly caused by physical insults from mechanical processes. These physical insults can initiate from an applied force to the enamel. Because the initiation of these conditions is different, the changes in enamel structure related with micro-cracks are not the same as the changes observed in the early stage of erosion or caries. For example, as a result of the demineralization process, loss of enamel crystals with corresponding compositional changes can be observed under acid challenges (enamel erosion), while the repeated physical insults may cause the fracture of enamel prismatic structures (micro-cracks) without changing the chemical composition. Therefore, the technology of treatments for these two types of micro damages is not the same.

The efficacy of a composition in increasing enamel micro-crack resistance can be evaluated by comparing micro-crack resistance of an enamel sample before and after treating the enamel sample with the composition. In the present disclosure, enamel micro-crack resistance is determined by an in vitro enamel micro-crack resistance model. The procedure for the micro-crack resistance model is illustrated in FIG. 1. Enamel samples obtained from bovine or human teeth may be used in the in vitro model. In some embodiments, the enamel sample is a human enamel. For example, the human enamel sample may be obtained by cutting the crown of a molar longitudinally into slices, e.g., slices that are about 1-2 mm thick, e.g., 2 mm thick. In other embodiments, the enamel sample is a bovine enamel. For example, the bovine enamel sample may be obtained by cutting the labial surface of an incisor into slices, e.g., slices that are about 1-2 mm thick, e.g., 1 mm thick.

Figure 2:
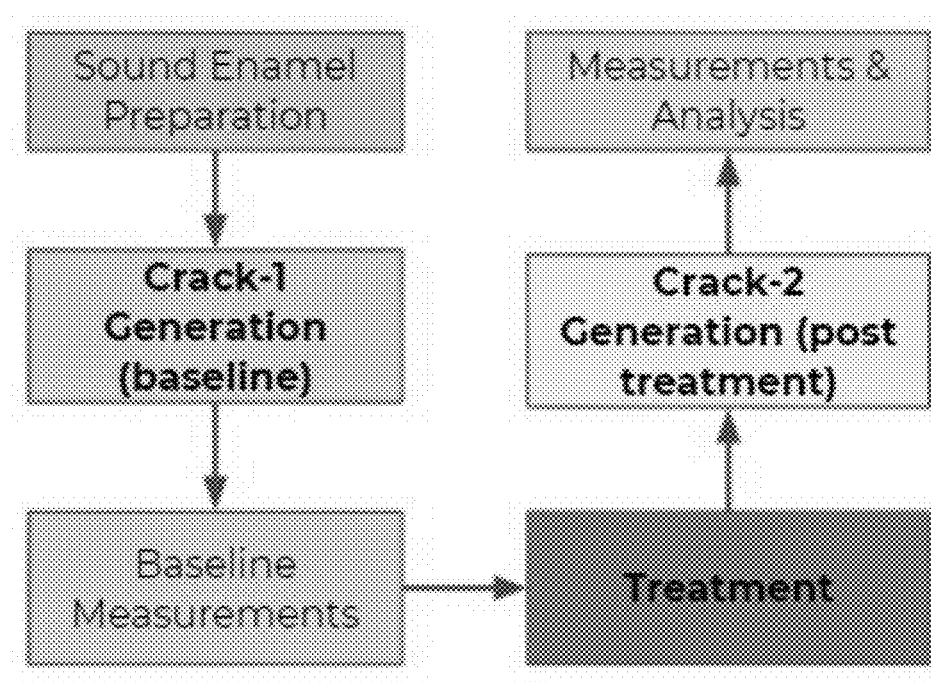
FIG. 2 shows a flowchart of a typical procedure for the micro-crack resistance model.

Micro-cracks (baseline micro-cracks) are generated by impressing an indenter into the enamel sample with a load (force). The load may be 200 gf-1000 gf, e.g., 300 gf, 500 gf, or 1000 gf. The indenter shape should be capable of producing geometrically similar impressions, irrespective of size and the impression should have well-defined points of measurement. In some embodiments, the indenter is in the form of a square-based pyramid. In certain embodiments, the indenter is a diamond indenter, e.g., a diamond indenter in the form of a square-based pyramid, e.g., a Vickers diamond. The indentation of enamel results in the development of Palmqvist cracks at each of indentation corners (FIG. 2). In certain embodiments, the enamel sample is a human enamel and the load is 500 gf.

Enamel micro-crack resistance can be determined by measuring and/or calculating micro-crack characteristics or mechanical properties of the enamel, e.g., crack length, fracture toughness, brittleness, or a combination thereof. In some embodiments, lower crack length, higher fracture toughness, lower crack brittleness, or a combination thereof indicates higher micro-crack resistance of the enamel sample.

The crack length is measured from the tip of the indentation diagonal to the end of the crack tip. The fracture toughness ($K_c$) is calculated according to $$Kc = 0.0084\left(\frac{E}{HV}\right)^{\frac{2}{5}}\left(\frac{2F}{L}\right)\frac{1}{c^{\frac{1}{2}}}$$

where E, HV, F, L and c are the elastic modulus, Vickers hardness, indentation load, average indentation diagonal length and crack length, respectively. The elastic modulus (E) is measured by using a Nanoindentation with Berkovich diamond indenter.

The Vickers hardness (HV) for each indentation is calculated according to $$HV = \frac{0.1891F}{L^2}$$

where F is the indentation load and L the indentation diagonal.

The indentation brittleness (B) of enamel is calculated according to $$B = \frac{HV \times E}{K^2}$$

where E and HV are the elastic modulus and Vickers hardness, respectively.

Enamel microscratches can be caused by the sliding or rubbing of abrasive external objects against the tooth surfaces. Several factors are reported to cause such enamel damage, including the use of an abrasive toothpaste, hard bristles, a vigorous brushing technique and ill-fitting dental appliances like retainers and dentures. It may also be caused by the use of toothpicks and miswaks, as well as the consumption of abrasive foods, such as tobacco and sunflower seeds. Beside these, people with habits such as nail biting and lip or tongue piercing, are subjected to higher risks of enamel microscratch. Another factor that can cause enamel microscratch is the combination of mechanical and chemical corrosion. Specifically, an acid attack on the enamel could compromise its mechanical properties and make it more susceptible to scratches.

Since the enamel microscratch is a microscopic damage at the tooth surface, it is difficult to be detected by naked eyes or the common tools used in clinics. However, if left untreated, the continuous scratching can cause a massive wear through the enamel (i.e., abrasion) and lead to severe consequences. It has been reported that the enamel loss due to abrasion may lead to symptoms such as increased tooth sensitivity to hot and cold, increased plaque trapping which will result in caries and periodontal disease. It may also be aesthetically unpleasant to some people. Microscratching could result in a rough and dull enamel surface, and could also allow extrinsic stains to accumulate, which may result in more staining on the enamel surface.

After measuring and/or calculating micro-crack, or microscratch, characteristics or mechanical properties of the enamel, e.g., crack length, width, volume, depth, fracture toughness, brittleness, or a combination thereof, the enamel sample is treated with a tested composition. The tested composition may be an oral care composition. Illustrative oral care compositions may include, but are not limited to, a toothpaste (dentifrice), a prophylactic paste, a tooth powder, a tooth gel (e.g., whitening gel), a chewing gum, a lozenge, a mouthwash, a paint-on gel, and varnish. In some embodiments, the oral care composition is a toothpaste, a tooth gel or a mouthwash. As used herein, the term "treating" means applying the composition to the enamel sample, e.g., pasting the composition on the enamel sample or placing the enamel sample in the composition. The enamel sample may be treated with the composition by applying the composition to the enamel sample, e.g., for at least 1 minute, for at least 2 minutes, for at least 3 minutes, for at least 5 minutes, or for at least 10 minutes, e.g., for 1, 2, 3, 4, 5, 6, 7, 8, 9, or 10 minutes. In some embodiments, the enamel sample is treated with the composition more than once, e.g., 2-10 times. The treatment process varies based on the products. For examples, the treatment with toothpaste may involve a 2-minute application of diluted toothpaste slurry twice a day for 5 days; For the treatment with gel type applications, the samples may be treated with the gels for 10 minutes once a day for 5 days; For varnish compositions, the samples may be treated for 2 minutes one time. In some embodiments, the tested composition is a solution, e.g., water or a buffered solution, e.g., phosphate buffered saline (PBS), containing a compound of interest, e.g., a compound known to affect mechanical properties of tooth enamel, e.g., a compound known to remineralize tooth enamel, e.g., fluoride, basic amino acids, e.g., arginine and HAP (hydroxyapatite).

During the treatment period, the enamel sample may be kept in a remineralization solution between the treatments, if the composition is applied to the enamel sample more than once, and/or after the last treatment. In some embodiments, the remineralization solution contains calcium chloride. In certain embodiments, the remineralization solution contains $CaCl_2.2H_2O$, $KH_2PO_4$, KCl and HEPEs buffer and the pH of the remineralization solution is adjusted to 7. In some embodiments, the enamel ample is kept in the remineralization solution at about 37° C., e.g., for at least 1 day, e.g., for at least 2 days, e.g., for 5 days.

After the treatment with the tested composition, the enamel sample is rinsed thoroughly with water and then the micro-cracks (post-treatment micro-cracks), or microscratches (post-treatment microscratches), are generated by impressing an indenter into the enamel sample with a load (force). Baseline micro-cracks, baseline microscratches and post-treatment micro-cracks or post-treatment microscratches, are generated in the same condition, e.g., using the same indenter and same load, which allows for a fair comparison between baseline micro-cracks and post-treatment micro-cracks. Crack length, width, volume, depth, fracture toughness, brittleness for post-treatment micro-cracks, or post-treatment microscratches, are measured and/or calculated as described above.

The changes in micro-crack, or microscratch, characteristics or mechanical properties of the enamel, e.g., crack or scratch length, width, depth, volume, fracture toughness and brittleness, are calculated by calculating the difference between the corresponding values obtained before and after treatments. These parameters may be used to evaluate the effect of compositions on enamel micro-crack resistance or microscratch resistance. In some embodiments, the increase of enamel micro-crack resistance is determined by the decrease of crack length, the increase of fracture toughness, the decrease of brittleness, or a combination thereof. In certain embodiments, the decrease in crack length indicates that enamel micro-crack resistance is increased. In certain embodiments, the increase in fracture toughness indicates that enamel micro-crack resistance is increased. In certain embodiments, the decrease in crack brittleness indicates that enamel micro-crack resistance is increased. In some embodiments, the increase of enamel microscratch resistance is determined by the decrease of volume, width, depth, or a combination thereof. In certain embodiments, the decrease in scratch volume indicates that enamel microscratch resistance is increased. In certain embodiments, the decrease in scratch width indicates that enamel microscratch resistance is increased. In certain embodiments, the decrease in scratch depth indicates that enamel microscratch resistance is increased.

The efficacy of the tested composition in increasing enamel micro-crack resistance is determined by comparing one or more parameters of the tested composition, e.g., change in crack length, change in fracture toughness, change in brittleness or a combination thereof, with those of a control composition. The control composition may be a composition, e.g., an oral care composition, e.g., toothpaste, gel, or mouthwash, or a solution, e.g., water or a buffered solution, e.g., phosphate buffered saline (PBS), that does not contain any ingredient that affects mechanical properties of tooth enamel. In some embodiments, the control composition does not contain any ingredient that remineralizes tooth enamel. In some embodiments, the control composition is a solution, e.g., water or a buffered solution, e.g., phosphate buffered saline (PBS). In certain embodiments, the control composition is water. In some embodiments, the control composition is the same type of composition as the tested composition but the control composition does not contain any ingredient that affects mechanical properties of enamel, e.g. remineralizes tooth enamel. For example, if the tested composition is a toothpaste containing a compound of interest, the control composition may be a toothpaste containing no ingredient, including the compound of interest, that may affect mechanical properties of enamel e.g., no ingredient that may remineralize tooth enamel. In some embodiments, if the tested composition is a solution, e.g., water or a buffered solution, e.g., phosphate buffered saline (PBS), containing a compound of interest, the control composition is the same as the tested solution except that the control composition does not contain the compound.

The efficacy of the tested composition in increasing enamel microscratch resistance is determined by comparing one or more parameters of the tested composition, e.g., change in scratch length, change in volume, change in width, change in depth, or a combination thereof, with those of a control composition. The control composition may be a composition, e.g., an oral care composition, e.g., toothpaste, gel, or mouthwash, or a solution, e.g., water or a buffered solution, e.g., phosphate buffered saline (PBS), that does not contain any ingredient that affects mechanical properties of tooth enamel. In some embodiments, the control composition does not contain any ingredient that remineralizes tooth enamel. In some embodiments, the control composition is a solution, e.g., water or a buffered solution, e.g., phosphate buffered saline (PBS). In certain embodiments, the control composition is water. In some embodiments, the control composition is the same type of composition as the tested composition but the control composition does not contain any ingredient that affects mechanical properties of enamel, e.g. remineralizes tooth enamel. For example, if the tested composition is a toothpaste containing a compound of interest, the control composition may be a toothpaste containing no ingredient, including the compound of interest, that may affect mechanical properties of enamel e.g., no ingredient that may remineralize tooth enamel. In some embodiments, if the tested composition is a solution, e.g., water or a buffered solution, e.g., phosphate buffered saline (PBS), containing a compound of interest, the control composition is the same as the tested solution except that the control composition does not contain the compound.

Examples

The enamel micro-crack resistance efficacy of oral care compositions is determined using an in vitro enamel micro-crack resistance model. The in vitro enamel resistance model is performed as follows. Bovine or human enamel is used in this model. Bovine enamel blocks are obtained from sound bovine incisors without defects. The labial surface of bovine teeth is cut to get enamel specimens (~3×3×2 mm) in which the enamel layer is ~1 mm thick and the dentin left in the specimen is ~1 mm thick. Human enamel blocks are obtained by removing the root portion of the molar and cutting the crown of the molar longitudinally into slices 2 mm thick using a water-cooled low-speed diamond saw. The enamel samples are mounted in the acrylic resin following the manufacturer's instructions. The embedded samples are grinded and polished with a sequential series of wet 400-4000 grit silicon carbide papers and nylon adhesive back discs with 0.25 µm diamond or colloidal silica suspension. The polished slices are rinsed thoroughly with distilled water (DDW) three times, sonicated in a water bath for 5 min, rinsed again, and allowed to air-dry.

Micro-cracks (baseline micro-cracks) are generated on the enamel specimen. Micro-indentation is performed using a micro-hardness tester with a Vickers diamond indenter at different loads (300 gf, 500 gf, and 1000 gf). At least 5 indents are made on each specimen. Typically, the indentation of enamel results in the development of Palmqvist cracks at each of the indentation corners. The average crack length, fracture toughness, brittleness for each sample is calculated.

The Vickers hardness (HV) for each indentation is calculated according to $$HV = \frac{0.1891 F}{L^2}$$

where F is the indentation load and L the indentation diagonal.

The fracture toughness (Kg) is calculated as $$Kc = 0.0084 \left(\frac{E}{HV}\right)^{\frac{2}{5}} \left(\frac{2F}{L}\right) \frac{1}{c^{\frac{1}{2}}}$$

where E, HV, F, L and c are the elastic modulus, Vickers hardness, indentation load, average indentation diagonal length and crack length, respectively.

The elastic modulus (E) is measured by using a Nanoindentation with Berkovich diamond indenter. The length of the 4 radial cracks for each indent is measured using a microscopy. The crack length is measured from the tip of the indentation diagonal to the end of the crack tip. The indentation brittleness (B) of enamel is calculated as $$B = \frac{HV \times E}{K^2}.$$

To optimize the conditions for generating the consistent micro-cracks on the enamel surface, the effect of different substrates and loads on the crack generation is examined with the bovine and human enamels at different indentation forces. With the 500 g of force (gf), the radially micro-cracks are generated around the indentation on the human enamel surface. In contrast, only irregular cracks are formed on the bovine enamel surface with the same amount of load. In addition, when examining the effect of the different forces, the induced cracks on human enamel are getting more visible with increasing forces, and the irregular cracks and deformation started forming at 1000 gf. Using the irregular cracks with random lengths and deformation, it would be challenging to calculate the mechanical properties such as fracture toughness and brittleness. On the other hand, by applying 500 gf of indentation force on 40 human enamel samples, the well-defined micro cracks are able to be generated at each of the indentation corners with the average crack length of 25-45 µm. The fracture toughness and brittleness are further calculated to be 0.8-1.2 MPa*m$^{0.5}$ and 200-400 µm$^{0.5}$ respectively. Based on the observation, the optimized force and substrate for generating the consistent micro-cracks are 500 gf and the human enamel. Therefore, in this study, micro-cracks are generated on human enamels with a load of 500 gf.

After measuring average crack length, fracture toughness, brittleness of the baseline micro-cracks, enamel samples are treated with tested formulations/products. Treatment process varies based on the products. For example, the treatment with toothpastes involves a 2-minute application of diluted toothpaste slurry twice a day for 5 days. For the treatment with gels, the samples are treated with the gels for 10 minutes once a day for 5 days. During the treatment period, samples are kept in remineralization solution at 37° C. After the treatment, the samples are rinsed thoroughly using deionized water. The post-treatment micro-cracks are generated on the enamel specimen in the same condition as used to generate baseline micro-cracks and the average crack length, fracture toughness, brittleness for each sample are calculated as described above. Statistical analysis between the tested samples and controls is conducted to evaluate the efficacy of products/formulations in crack resistance.

The enamel micro-crack resistance efficacy of a toothpaste containing 0.24% sodium fluoride, a silica-based toothpaste containing 5% HAP (hydroxyapatite), two calcium-based toothpastes containing 1.5% arginine or 1.5% arginine+8% HAP, respectively, and a HAP gel is examined by the in vitro enamel micro-crack resistance model. The NaF toothpaste tested in this experiment is a commercial product believed to be able to remineralize tooth enamel. The formula of the silica-based toothpaste containing HAP is shown in Table 1. The formulas of the two calcium-based toothpastes are shown in Table 2. For the HAP gel, 5% micro-HAP is incorporated into 4% HEC gel base in Table 3. Water is used as a negative control. In this experiment, four human enamel blocks are used for each formulation. The results are shown in Table 4.

TABLE 1

| Ingredient | 5% HAP toothpaste |
|---|---|
| Sorbitol (70% soln.) | 47.5% |
| Glycerin | 6% |
| PEG 600 | 2% |
| Synthetic abrasive silica | 8% |
| Synthetic high cleaning silica | 8% |
| Synthetic thickening silica | 1.5% |
| Sodium CMC/microcrystalline cellulose | 1% |
| Xanthan gum | 0.3% |
| Micro-HAP | 5% |
| SLS | 1.5% |
| Cocamidopropyl betaine | 1.25% |
| Flavors | 0.9% |
| Water | Q.S. |

TABLE 2

| Ingredient | 1.5% Arg Toothpaste | 1.5% Arg + 8% HAP toothpaste |
|---|---|---|
| SORBITOL | 20 | 20 |
| XANTHAN GUM | 0.7 | 0.7 |
| SODIUM SACCHARIN | 0.25 | 0.25 |
| ARGININE-BICARBONATE (40.8% DILUTION)* | 3.68 | 3.68 |
| SODIUM BICARBONATE | 1 | 1 |
| SYNTHETIC THICKENING SILICA | 5.5 | 3.5 |
| CALCIUM CARBONATE | 35 | 27 |
| SODIUM LAURYL SULFATE (30% DILUTION) | 5 | 5 |
| FLAVORANTS | 1-2 | 1-2 |
| PRESERVATIVE | 0.1-1 | 0.1-1 |
| HAP | 0 | 8 |
| WATER | Q.S. | Q.S. |

*3.68% Arginine Bicarbonate Solution (40.8% dilution) is equivalent to 1.5% Arginine.

TABLE 3

| Ingredient | 5% HAP gel |
|---|---|
| HEC | 4% |
| HAP | 5% |
| Water | 91% |

TABLE 4

| | Change in crack length (μm) | Change in fracture toughness ($K_c$) (MPa·$m^{0.5}$) | Change in brittleness (B) ($m^{-1}$) |
|---|---|---|---|
| water | 0.87 ± 1.98 | −0.02 ± 0.03 | 1.17 ± 22.89 |
| 0.24% NaF toothpaste | 1.34 ± 4.51 | −0.04 ± 0.07 | −18.12 ± 67.55 |
| 5% HAP toothpaste | −7.01 ± 2.94 | 0.11 ± 0.048 | −65.06 ± 47.38 |
| 1.5% Arg toothpaste | −0.021 ± 0.898 | −0.003 ± 0.013 | −2.086 ± 16.395 |
| 8% HAP + 1.5% Arg toothpaste | −7.93 ± 1.898 | 0.1 ± 0.012 | −65.01 ± 26.122 |
| 4% HEC + 5% HAP gel | −14.94 ± 2.53 | 0.23 ± 0.09 | −100.47 ± 46.74 |

As shown in Table 4, there are no obvious changes in crack length, fracture toughness and brittleness with the samples treated with 0.24% sodium fluoride toothpaste. This shows that the NaF toothpaste believed to be able to remineralize tooth enamel does not perform well in increasing the micro-crack resistance of tooth enamel. In contrast, the length of micro-cracks after treatment with 5% HAP toothpaste or 4% HEC+5% HAP gel is significantly shorter than the ones before treatment. In addition, the increase of fracture toughness and decrease of brittleness are believed to be observed in the samples treated with 5% HAP toothpaste or 4% HEC+5% HAP gel. Similarly, the calcium-based toothpaste containing 1.5% arginine does not perform well in increasing the micro-crack resistance of tooth enamel, while the calcium-based toothpaste 1.5% arginine+8% HAP significantly increased the micro-crack resistance of tooth enamel. These results show that the treatment with HAP toothpaste or gel increases the micro-crack resistance of tooth enamel.

Enamel Microscratch Resistance Model

The present formulations are tested in a microscratch model to evaluate their efficacy in resisting microscratch, according to the following procedure.

Enamel Sample Preparation a. Human molar without any restored caries is sectioned longitudinally into two pieces using a water-cooled low-speed diamond saw. After sectioning, the samples are mounted in the acrylic resin with the exposed occlusal surface. The embedded samples are grinded and polished with a sequential series of wet 400-4000 grit silicon carbide papers and nylon adhesive back discs with 0.25 μm diamond or colloidal silica suspension. The polished slices are rinsed thoroughly with distilled water three times, sonicated in a water bath for 5 min, rinsed again, and allowed to air-dry.

b. Microscratch generation

Nanoindentation with a Berkovich diamond tip indenter is used to generate a baseline ("scratch-1") microscratch on the enamel surfaces. In order to generate microscratch with sizes close to natural scratch, the normal force is maintained at 10 mN during the scratching. At least 5 indents are made at each specimen.

c. The image for baseline microscratches are recorded using a microscope.

d. The width, depth and volume are measured for the baseline microscratches.

e. The average scratch width, depth, and volume are calculated for each sample.

Treatment f. The formulation/products are applied on the enamel samples. Treatment process varies based on the products. For example, the treatment with toothpaste involved a 2 min application of diluted toothpaste slurry twice a day. For the treatment with Gel type applications, the samples are treated with gel for 10 minutes once a day.

g. The treated samples are rinsed with deionized water and then kept in the remineralized solution at 37° C. for 1 hour.

Acid Challenges h. The samples are removed from the remineralization solution and rinsed with deionized water.

i. The samples are then soaked in 1% citric acid (pH adjusted to 3.6) solution for 2 minutes.

j. The treated samples are then rinsed with deionized water and then kept in the remineralized solution at 37° C. for 1 hour.

k. The acid challenge steps h-j are repeated three times. If a toothpaste is used for the experiment, the treatment is applied again after 4 times of acid challenges.

l. The samples are kept in the remineralization solution at 37° C. overnight.
m. The daily treatment and acid challenges (steps f-l) are repeated for 5 days.

Post Treatment n. The samples are rinsed thoroughly using deionized water.
o. Post-treatment microscratches (scratch-2) are generated on the enamel specimens following the method described in step b above.
p. The images for post-treatment microscratches are recorded using a microscope.
q. The width, depth and volume for the post-treatment microscratched are measured.
r. The average scratch width, depth, and volume are calculated for each sample.
s. The changes in average width, depth, and volume are calculated or each treated sample.
t. The statistical analysis are conducted between testing samples and controls to evaluate the efficacy of products/formulations in microscratch resistance.

Results:

The following toothpastes and gels are tested:

Smaller values in $\Delta$Volume, $\Delta$Width and $\Delta$Depth indicate a better performance in resisting microscratch.

Results for Toothpastes

Two commercially available products (Commercial Toothpaste I and Commercial Toothpaste II) and three test toothpaste formulations are tested in the micro scratch resistant model as shown in Table 10. Commercial Toothpaste I and Commercial Toothpaste II are claimed to resist enamel microdamage.

The post-treatment microscratch with the Commercial Toothpaste I-treated sample is much deeper than the other microscratches with the samples treated with other toothpastes. For the samples treated with Commercial Toothpaste II and Arginine toothpastes, the post treatment scratches are less deep than the one observed in the Commercial Toothpaste I group. In contrast, it is clearly observed that the microscratches are significantly shallower when the samples are treated with HAP-containing toothpastes. Similar trends could be found when comparing the changes in microscratch sizes. The changes in scratch volumes after different toothpaste treatments are shown in Table 10, where a larger change in volume indicates a larger enamel loss:

TABLE 9

Formulations for microscratch analysis

| Forms | Toothpaste | | | | | Gel | |
|---|---|---|---|---|---|---|---|
| Names | Commercial Toothpaste I | Commercial Toothpaste II | HAP Toothpaste | Arginine Toothpaste | Arginine + HAP Toothpaste | HEC Gel | HEC + HAP Gel |
| Active ingredient | Glycine (0.5%) | Zinc Hydroxyapatite (15%) | HAP + CaCO3 (HAP 5%) | Arginine | Arginine + HAP +. CaCO3 (HAP 8%) | — | HAP + CaCO3 (HAP 5% or 8%) |
| Other ingredients | calcium carbonate, glycerol, water, sodium lauryl sulfate, carboxymethylcellulose, sodium saccharin, spearmint oil | Aqua, Hydrated Silica, Sorbitol, Glycerin, Silica, Aroma, Cellulose Gum, Xylitol, Zinc PCA, Sodium Myristoyl Sarcosinate, Sodium Methyl Cocoyl Taurate, Tetrapotassium Pyrophosphate, Sodium Saccharin, Zinc Citrate, Citric Acid, Ammonium Acryloyldimethyltaurate/ VP Copolymer, Benzyl Alcohol, Phenoxyethanol, Sodium Benzoate, Limonene. | Water, Cocamidopropyl Betaine, Glycerin, Polyethylene Glycol, Sodium Carboxymethylcellulose, Sodium Lauryl Sulfate, Sodium Saccharin, Sorbitol, Silica, Xanthan Gum | Water, Carbon dioxide, Limestone, Sodium bicarbonate, Sodium saccharin, Sorbitol, Xanthan gum, Synthetic thickening silica | | | Water, Hydroxyethylcellulose |

Measurements and Calculations

The images of microscratch are recorded before and after treatment procedure and analyzed according to the procedure above. The scratch sizes (width, depth and volume) are measured using a Keyence laser scanning microscope. The changes in size are calculated according to the following equations:

$$\Delta\text{Volume} = \text{Volume}_{post\text{-}treatment} - \text{Volume}_{baseline}$$

$$\Delta\text{Width} = \text{Width}_{post\text{-}treatment} - \text{Width}_{baseline}$$

$$\Delta\text{Depth} = \text{Depth}_{post\text{-}treatment} - \text{Depth}_{baseline}$$

TABLE 10

Changes in scratch volume after toothpaste treatments

| | Water | Commercial Toothpaste I | Commercial Toothpaste II | HAP 5% | Arginine | Arginine + HAP 8% |
|---|---|---|---|---|---|---|
| Changes in volume ($\mu m^3$) | 57.63 | 64.86 | 40.24 | 26.06 | 37.63 | 18.57 |
| Group | A | A | AB | C | B | C |

Note:
different group letters indicate significant differences between the groups ($P < 0.05$).

The changes in microscratch widths after different toothpaste treatments are shown in Table 11, where a larger change in width indicates a larger enamel loss:

TABLE 11

Changes in microscratch width after toothpaste treatments

|  | Water | Commercial Toothpaste I | Commercial Toothpaste II | HAP 5% | Arginine | Arginine + HAP 8% |
|---|---|---|---|---|---|---|
| Changes in Width (μm) | 1.13 | 1.41 | 0.65 | 0.37 | 0.85 | 0.36 |
| Group | A | B | C | D | AC | D |

Note:
different group letters indicate significant differences between the groups ($P < 0.05$).

The changes in microscratch depths after different toothpaste treatments are shown in Table 12, where a larger change in depth indicates a larger enamel loss:

TABLE 12

Changes in microscratch depth after toothpaste treatments

|  | Water | Commercial Toothpaste I | Commercial Toothpaste II | HAP 5% | Arginine | Arginine + HAP 8% |
|---|---|---|---|---|---|---|
| Changes in Depth (μm) | 0.17 | 0.17 | 0.13 | 0.06 | 0.11 | 0.07 |
| Group | A | AB | B | C | D | C |

Note:
different group letters indicate significant differences between the groups ($P < 0.05$).

For the samples treated with HAP toothpaste, the size changes (volume, width and depth) are significantly smaller than the samples treated with other toothpaste. The results indicate that the HAP toothpaste has shown a better performance in improving the microscratch resistance than other toothpastes.

Results for Gels

The leave-on gels with 5% and 8% HAP are also tested with the microscratch resistance model. The changes in scratch volumes after different treatments are shown in Table 13, where a larger change in volume indicates a larger enamel loss:

TABLE 13

Changes in scratch volume after gel treatments

|  | Water | HEC | 5% HAP | 8% HAP |
|---|---|---|---|---|
| Changes in volume (μm$^3$) | 60.85 | 42.99 | 18.06 | 9.46 |
| Group | A | B | C | D |

Note:
different group letters indicate significant differences between the groups ($P < 0.05$).

The changes in microscratch widths after different gel treatments are shown in Table 14, where a larger change in width indicates a larger enamel loss:

TABLE 14

Changes in microscratch width after gel treatments

|  | Water | HEC | 5% HAP | 8% HAP |
|---|---|---|---|---|
| Changes in width (μm) | 1.32 | 0.69 | 0.24 | 0.24 |
| Group | A | A | B | B |

Note:
different group letters indicate significant differences between the groups ($P < 0.05$).

The changes in microscratch depths after different gel treatments are shown in Table 15, where a larger change in width indicates a larger enamel loss:

TABLE 15

Changes in microscratch depth after gel treatments

|  | Water | HEC | 5% HAP | 8% HAP |
|---|---|---|---|---|
| Changes in volume (μm$^3$) | 0.13 | 0.1 | 0.08 | 0.04 |
| Group | A | AB | B | C |

Note:
different group letters indicate significant differences between the groups ($P < 0.05$).

Compared to the control group (HEC gel), only shallow microscratches are observable for the samples treated with HAP gels, and their scratch-size changes (volume, width and depth) are significantly smaller than the samples treated with gel without HAP. Furthermore, a smaller microscratch is observed when the HAP concentration is increased from 5% to 8%. The results indicate that the HAP with the gel form is effective in resisting the microscratch on the enamel surface.

In order to compare the performance in microscratch resistance among the tested toothpaste and gels, the changes in microscratch sizes (width and depth) from different tests are mapped out. The results clearly demonstrated that the HAP technology has a great potential in resisting the microscratch on the enamel surface.

The data from the microscratch resistance model demonstrates that the HAP formulations described herein have a great potential in resisting microscratches on the enamel surface.

While the disclosure has been described with respect to specific examples including presently preferred modes of carrying out the disclosure, those skilled in the art will appreciate that there are numerous variations and permutations of the above described systems and techniques. It is to be understood that other embodiments may be utilized and structural and functional modifications may be made without departing from the scope of the present disclosure. Thus, the scope of the disclosure should be construed broadly as set forth in the appended claims.

What is claimed is:
1. A method of identifying compositions that are effective in increasing enamel micro-crack resistance or evaluating the efficacy of compositions in increasing enamel micro-crack resistance; comprising:
 a) providing an enamel sample;
 b) generating baseline micro-cracks on the enamel sample;
 c) measuring and/or calculating one or more baseline micro-crack characteristics or mechanical properties of the enamel;
 d) treating the enamel sample with a composition;

e) generating post-treatment micro-cracks on the enamel sample;
f) measuring and/or calculating one or more post-treatment micro-crack characteristics or mechanical properties of the enamel;
g) determining one or more parameters which are changes of the one or more micro-crack characteristics or mechanical properties of the enamel by calculating the difference between the corresponding values obtained before and after the treatment;
h) comparing the one or more parameters of the composition with those of a control composition; and
i) selecting or identifying the composition for further development or evaluating the efficacy of the composition in increasing enamel micro-crack resistance based on its ability to increase micro-crack resistance relative to the control composition.

2. The method of claim 1, wherein the micro-cracks are generated by impressing an indenter into the enamel sample with a load.

3. The method of claim 1, wherein the enamel sample is a human or bovine enamel.

4. The method of claim 2, wherein the load is 200 gf-1000 gf.

5. The method of claim 1, wherein in steps c) and f), the one or more micro-crack characteristics or mechanical properties of the enamel are selected from crack length, fracture toughness, brittleness, and a combination thereof.

6. The method of claim 1, wherein the composition is an oral care composition.

7. The method of claim 1, wherein the one or more parameters is selected from change in crack length, change in fracture toughness, change in brittleness and a combination thereof.

8. A method of identifying compositions that are effective in increasing enamel microscratch resistance or evaluating the efficacy of compositions in increasing enamel microscratch resistance; comprising:
   a) providing an enamel sample;
   b) generating baseline microscratches on the enamel sample;
   c) measuring and/or calculating one or more baseline microscratch characteristics or mechanical properties of the enamel;
   d) treating the enamel sample with a test composition;
   e) generating post-treatment microscratches on the enamel sample;
   f) measuring and/or calculating one or more post-treatment microscratch characteristics or mechanical properties of the enamel;
   g) determining one or more parameters which are changes of the one or more microscratch characteristics or mechanical properties of the enamel by calculating the difference between the corresponding values obtained before and after the treatment;
   h) comparing the one or more parameters of the composition with those of a control composition; and
   i) selecting or identifying the composition for further development or evaluating the efficacy of the composition in increasing enamel microscratch resistance based on its ability to increase microscratch resistance relative to the control composition.

9. The method of claim 8, wherein the enamel sample is a human or bovine enamel.

10. The method of claim 8, wherein the microscratches are generated by nanoindentation to generate a baseline microscratch (microscratch 1).

11. The method of claim 8, wherein the microscratch is generated by maintaining a force from 5 mN-50 mN upon the enamel.

12. The method of claim 8, wherein the enamel is treated with the test composition.

13. The method of claim 8, wherein the enamel is subjected to an acid challenge subsequent to being treated with a test composition.

14. The method of claim 8, wherein the enamel samples are subject to further microscratches (microscratch 2) subsequent to treatment with the test composition and/or acid challenge.

15. The method of claim 8, wherein the test composition in step d) is an oral care composition, the control composition is the same type of oral care composition as the test composition, and the control composition does not contain any ingredient that affects physical properties of tooth enamel.

* * * * *